(12) United States Patent
James-Roxby et al.

(10) Patent No.: US 7,949,790 B1
(45) Date of Patent: May 24, 2011

(54) MACHINES FOR INSERTING OR REMOVING FIXED LENGTH DATA AT A FIXED LOCATION IN A SERIAL DATA STREAM

(75) Inventors: Philip B. James-Roxby, Longmont, CO (US); Gordon J. Brebner, San Jose, CA (US); Michael E. Attig, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 317 days.

(21) Appl. No.: 12/268,674

(22) Filed: Nov. 11, 2008

(51) Int. Cl.
*G06F 15/16* (2006.01)
*H04J 3/00* (2006.01)

(52) U.S. Cl. .................. 709/246; 709/230; 370/476
(58) Field of Classification Search .................. None
See application file for complete search history.

(56) References Cited

U.S. PATENT DOCUMENTS

| | | | | |
|---|---|---|---|---|
| 5,500,796 A | * | 3/1996 | Black, Jr. ........................ | 704/9 |
| 5,961,626 A | * | 10/1999 | Harrison et al. .............. | 710/305 |
| 7,788,402 B1 | * | 8/2010 | Keller et al. .................. | 709/238 |
| 2007/0058668 A1 | * | 3/2007 | Culbreth et al. .............. | 370/465 |

OTHER PUBLICATIONS

U.S. Appl. No. 11/799,897, filed May 3, 2007, Brebner et al.
U.S. Appl. No. 11/799,860, filed May 3, 2007, Keller et al.
U.S. Appl. No. 11/799,953, filed May 3, 2007, James-Roxby et al.
U.S. Appl. No. 11/799,966, filed May 3, 2007, Keller et al.
U.S. Appl. No. 11/799,898, filed May 3, 2007, Keller et al.

* cited by examiner

*Primary Examiner* — John B. Walsh
(74) *Attorney, Agent, or Firm* — Scott Hewett; LeRoy D. Maunu (57) ABSTRACT

A method of modifying a data stream (12) in an integrated circuit ("IC") determines a modification point (14) in the data stream from a beginning (16) of the data stream. The modification point is within a word (W7) and has an offset (oww) from the beginning of the word. Data is removed (18) or added (24) to produce a modified data stream (20).

18 Claims, 4 Drawing Sheets

MACHINES FOR INSERTING OR REMOVING FIXED LENGTH DATA AT A FIXED LOCATION IN A SERIAL DATA STREAM

FIELD OF THE INVENTION

The present invention generally relates to packet processing systems, and more particularly to selectively altering the data contained in a packet or other data stream.

BACKGROUND OF THE INVENTION

A network packet processor may input a stream of network packets, manipulate the contents of the network packets, and output another stream of modified network packets. The manipulations may implement a protocol for processing network packets. For example, the network packet processor may implement a protocol layer of a communication protocol, and for a high-level packet received from a higher protocol layer and delivered to a lower protocol layer for eventual transmission on the communication media, the manipulations may encapsulate the high-level packet within a low-level packet of the lower protocol layer.

A protocol designer may develop a specification of the processing of network packets by a network packet processor. A hardware designer, such as an integrated circuit designer, may create a hardware implementation of a network packet processor that complies with the requirements specified by the protocol designer. Thus, development of a network packet processor implemented in hardware may require the specialized knowledge and skills of at least two separate fields of expertise. Because multiple fields of expertise may be required during development of a hardware implementation of a network packet processor, development of a network packet processor may be time consuming and expense.

Rapid development of the protocol or implementation of a network packet processor may improve the timeliness and/or quality of the network packet processor. For example, if a hardware implementation can be generated quickly given a specification of the processing of network packets, deficiencies discovered in an initial implementation may be addressed by modifying the specification and generating an improved implementation. Additional iterations of improvement may be possible if the hardware implementation can be generated quickly from a protocol specification.

It is often desirable to optionally insert or remove a fixed amount of data in a particular location in an existing data stream. Some machines allow inserting data only at certain points in the data stream, such as at the beginning or end of a field (e.g., a header segment) or at a byte boundary. Others are limited to a single fixed-size insertions or deletions. As the packet network environment becomes more complex and the nature of the data and insertion/deletion points more general, such machines can become physically large. Furthermore, user-designed machines are often tedious to develop and often are too error-prone to incorporate into a large complier.

SUMMARY OF THE INVENTION

Disclosed here are a machine and method for inserting or removing fixed length data at a fixed location in a serial data stream. Embodiments of the present invention enable data insertion at specified points in the data stream as well as removal of specified data in a stream.

A method of modifying a data stream in an integrated circuit ("IC") determines a modification point in the data stream from a beginning of the data stream. The modification point is within a word and has an offset from the beginning of the word. Data is removed or added to produce a modified data stream.

DETAILED DESCRIPTION

Data of known, arbitrary data length are inserted or removed from a data stream at selected, arbitrary insertion and removal points. Several insertion or removal operations on a data stream are achieved by chaining relatively simple machines and by operating the chained machines in a selected sequence. One embodiments is configured in a network packet processor section of a programmable logic device (PLD) that may be automatically generated from the specification of the processing protocol of the network packet processor.

A single machine can be automatically constructed if four elements are known: 1) whether the operation is an INSERT operation or a REMOVE operation; 2) the insertion/removal point in the data stream; 3) the length of data to be inserted or removed; and 4) the bitwidth of the data stream. The bitwidth is the width of the data path (e.g., 16-bit, 32-bit, etc.). In a particular embodiment, a packet processing language, such as the textual language for defining a network packet processing system described in co-pending, co-owned U.S. patent application Ser. No. 11/799,897, entitled GENERATION OF A SPECIFICATION OF A NETWORK PACKET PROCESSOR, by Brebner et al., filed May 3, 2007, the disclosure of which is hereby incorporated by reference in its entirety for all purposes, allows the first three values to be automatically determined from INSERT or REMOVE statements in the textual language specification of the machine when the circuit is compiled. The bitwidth is made available as a side file (i.e., entered by the user before the machine is compiled), or is a constant (e.g., for a complier used on circuits known to have a specified bitwidth) called by the complier during compilation.

Some embodiments use a single machine allowing a data chunk of arbitrary length to be placed at an arbitrary location in the data stream. In other words, the inserted data is not restricted to a particular length, nor are the insertion or removal points restricted to byte boundaries. Further embodiments chain machines together to perform multiple removal or insertion processes in a serial fashion. "Chaining" refers to the serial order in which the machines operate. In one embodiment, the machines are arranged to operate in reverse order of their point of insertion or removal ("I/R point"). In a particular embodiment, a machine is a synchronous pipeline circuit or series of synchronous pipeline circuits.

An example of a simple G-language specification is:
    insert InserteeData after IP;
this would insert the data stored in InserteeData (a variable) after the named field IP. If this was the only insert in the program, then this would result in a single machine. However, if the same example further included:
    [IP.Port==0x800] insert NewShim after TCP;
this would lead to a chained machine. Note, the second insert is guarded, making the insert optional.

The I/R point is measured from the front of the data stream or packet. That is, the machine who's I/R point is nearest to the end of the packet operates first. If two machines have the same I/R point and one of the machines is an insertion machine and the other a removal machine, the removal machine operates first. The compiler combines two separate insert statements into one where it can, but if the inserts are guarded with different expressions, one might have two inserts at the same point in the data stream. The insertions would typically be done in a random order, but in practice, only one insert will be active for a given packet, the other insert will simply pass the data on. Operating the machine with the I/R point furthest from the front of the data stream or packet first insures that the I/R points of other machines closer to the front (i.e., "upstream") are not affected.

In an exemplary embodiment, a number of machines (also known as circuits or "blocks") are automatically generated by a compiler or defined by a programmer use an interface between blocks as shown in Table 1:

TABLE 1

Block Interface

| Name | Source/Destination | Purpose |
| --- | --- | --- |
| readyOutput | To downstream stage (block) | Indicate insertion is occurring |
| din | From downstream stage | Current data stream |
| validInput | From downstream stage | Valid flag for din |
| readyInput | From downstream stage | Downstream is ready to send |
| dout | To upstream stage | New data stream |
| validOutput | To upstream stage | Valid flag for dout |
| numDataInValid | From downstream stage | Number of valid bits in the current input word (din) |
| numDataOutValid | To upstream stage | Number of valid bits in the current output word (dout) |
| eofIN | From downstream stage | End of frame indication for current input packet on din |
| oefOut | To upstream stage | End of frame indication for current output packet on dout |

The blocks act in a synchronous pipeline, so there are data and flags coming every cycle. The valid/invalid flags are used to keep pumping data through the pipeline, as one cannot suspend pipeline operation waiting until valid data is received or ready to be sent.

A complier or programmer can generate (define) a machine according to an embodiment as illustrated in the following example. The starting offset for an insert or remove operation is defined by the word offset ("wo") and offset within word ("oww") (if any) relative to the packet entering the generated block. The length of the data to be inserted or removed ("in-sertee" or "removee" data) is defined as whole words ("ww") and remaining bits ("rb") (if any).

Basically, the I/R points are sorted by position, grouped by related guards (if any), contiguous insertions and removals within the same guarded group are combined, and a machine is built for each guarded group. For a word size w, in a REMOVE block, the finite state machine ("FSM") skips word offsets that are valid input words (see, e.g., FIG. 1A, W1-W6), and then reads the next valid input word until one of two cases occurs, the first case being where the remaining bits are less than or equal to the word size minus the offset within the word, and the second case being where the remaining bits are greater than the word size minus the offset within the word. The input and output sources and destinations are given above in Table 1.

In the first case (rb<=w−oww) (see, e.g., FIG. 1A, where $rb_r$ is less than W7−oww):
  i) the block (machine) has a register size of w−rb; (if oww>0) the first oww bits of the last-read word (see, e.g., FIG. 1A, the first portion of W7 that will become W7' in FIG. 1B) are stored in the top part of the register
  ii) output one invalid word (i.e., output dout with an invalid output flag validOutput, see Table 1)
  iii) If ww>0, the FSM then inputs ww valid words and outputs ww invalid words (see, e.g., FIG. 1A, W7, W8 for $ww_r$=2)
  iv) (If w−oww−rb>0) the last w−oww−rb bits of the last-read invalid word (see, e.g., FIG. 1A, the last portion of W9 that will become W9' in FIG. 1B) are stored in the bottom part of the register
  v) the FSM then inputs valid words: register contents and first rb bits of input are output and the last w−rb bits of input are stored in the register
  vi) at END, the FSM outputs the contents of the register and rb zeros as an extra valid word In the second case (rb>w−oww):
  i) the block has a register size of oww, and the first oww bits of the last-read word [W7] are stored in the register
  ii) one invalid word is output
  iii) if ww>0, the FSM then inputs ww valid words from the upstream block and outputs ww invalid words to the downstream block
  iv) the FSM then inputs valid words: the register contents and the first w−oww bits of the input are output and the last oww bits of the input are stored in the register (followed by w−oww bits of word 10 offset by (oww+rb) mod w)
  vi) at END, the FSM outputs the top w−rb bits of the register contents and rb zeros as an extra valid word In an insert block, the FSM skips word offset valid input words and then reads the next valid input word until one of two cases occurs. There are three cases the FSM could encounter. The first case is there the whole word offset equals zero (in other words, the insertee is less than one word wide), and the remaining bits are less than or equal to the word size minus the offset within a word (i.e., the addition of the remaining bits to the leading oww bits are less than the word size). The second case is where the whole word offset is greater than zero and the remaining bits are less than or equal to the word size minus the offset within a word. The third case is there the remaining bits are greater than the word size minus the offset within a word.

In the first case (ww=0; rb<=w−oww) (i.e., less than a whole word of data is to be inserted and the leading bits plus the inserted bits is less than a word size):
  i) the block has a register size of rb; and the last rb bits of the last-read word are stored in the register ii) the block outputs the first oww bits of the last-read word and rb bits of the insertee and the next w−oww−rb bits of the last-read word as a valid word In the second case (ww>0; rb<=w−oww):

i) the block has a register size of w−oww, and stores the last w−oww bits of the last-read word in the top part of the register ii) the block outputs the first oww bits of the last-read word and the first w−oww bits of the insertee data iii) the FSM then sends a NOT READY signal backwards to the preceding block and outputputs ww−1 words, which generally include a portion of a preceding insertee word (e.g., the remaining bits (equal to oww) of the first insertee word) and a portion of the following insertee word (e.g., the first w−oww bits of the second insertee word).

iv) the FSM then sends a NOT READY signal backwards and outputs the remaining insertee bits, which are the trailing oww bits of the final insertee word and the remaining bits (which total to less than a full word), and then the top w−rb−oww bits of the register, which is the first portion of the last w−oww bits of the last-read word stored in step (i), and which are added to the final insertee bits form a valid output word v) The FSM then reads the next valid word and outputs rb bits from the register at offset w−rb−oww of the register (i.e., the remainder of the bits stored in step (i)), and the first w−rb bits of the input (i.e., the first portion of the next valid word added to the stored bits from the register to form a complete valid output word), and the last rb bits of the input are stored In the third case (rb>w−oww):

i) the block has register of size rb and the last w−oww of the last-read word are stored in the top part of the register ii) the block outputs first oww bits of last-read word and the first w−oww insertee bits of either the first insertee word (if any) or the first w−oww bits of the remaining bits iii) if ww>0, the FSM then sends a NOT READY signal backwards and outputs the next ww insertee words iv) The FSM then reads the next valid word and outputs the last rb−w+oww insertee bits and the top w−oww bits of the register and the w−oww bits offset by (rb−w+oww) in the input.

The last w−rb bits are stored. Thereafter, for the following words, w−rb is output from the register, the rb value is output from the input, and the next w−rb from the input is stored as the next word is read. In each case of insertion or removal, the number of valid bits for the ongoing data stream is updated to account for the insertion or removal of data. The number of valid bits refers to the valid bits per word, so it will never grow above the log 2 of the word width. In the example given in Table 1, above, it is the numDataOutValid signal.

It is possible for a complier to automatically build hardware (i.e., machines) for inserting and removing data from packets or other data streams given the four elements listed above. For example, a finite state machine ("FSM") can be automatically be built to have four regions according to a textual language description as described in co-pending, co-owned U.S. patent application Ser. No. 11/799,897, entitled GENERATION OF A SPECIFICATION OF A NETWORK PACKET PROCESSOR, by Brebner et al., filed May 3, 2007 previously incorporated by reference in its entirety for all purposes. The type of operation, the I/R point, and the length of data to be inserted or removed can be determined from the insertion or removal statements in the textual language description. The four regions of the FSM include: 1) before insertion or removal, 2) during insertion or removal, 3) after insertion or removal, and 4) clean up, which empties the register. In a particular embodiment, the FSM is a synchronous pipeline circuit and the movement between regions is determined by the validity of the data.

Figure 1A:
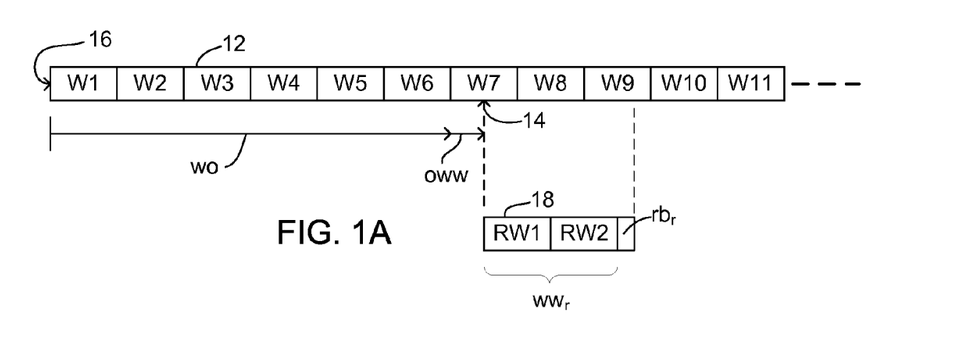
FIG. 1A shows a data stream, remove point, and remove data according to an embodiment.

FIGS. 1A-1D illustrate a removal and insertion operation according to an embodiment. FIG. 1A shows a data stream, remove point, and remove data according to an embodiment. In FIG. 1A, the data stream 12 includes a series of words W1, W2, . . . . A removal point 14 (generally, a "modification point") is measured from a beginning 16 of the data stream 12 as a whole-word offset wo (in this case, six whole words) and an offset within a word oww (which in this case is an offset within word W7 from the boundary between W6 and W7). Removee data 18 includes two words RW1, RW2, and removal remaining bits $rb_r$. In this example, rb is less than w−oww, so a portion of W9 will remain as valid data. In an alternative embodiment, the removal point is at an integer number of whole words and occurs on a word boundary. Similarly, removee data alternatively does not include remaining bits, but is only complete words.

Figure 1B:
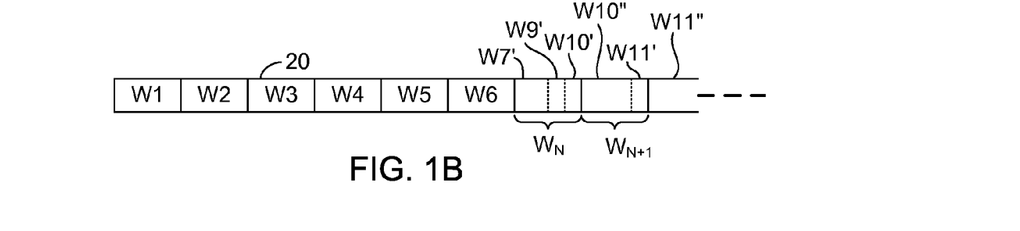
FIG. 1B shows a modified data stream 20 after operation of a removal machine according to an embodiment.

FIG. 1B shows a modified data stream 20 after operation of a removal machine according to an embodiment. A leading portion W7' of valid bits from the seventh word (equal to the number of oww bits) and a trailing portion of valid bits W9' of the ninth word (equal to the w−oww−rb bits) remain. Removal of the data from the data stream results in the first full word $W_N$ following W6 to be made up of word portions W7', W9', and leading word portion W10'. The following word $W_{N+1}$ is made up of a remaining word portion W10" and a leading word portion W11' of the following word, and so on. Previous word boundaries of original words W10 and W11 are shown as dashed lines for purposes of convenient illustration and comparison. Zeros may be added to the final word in the data stream, if necessary.

Figure 1C:
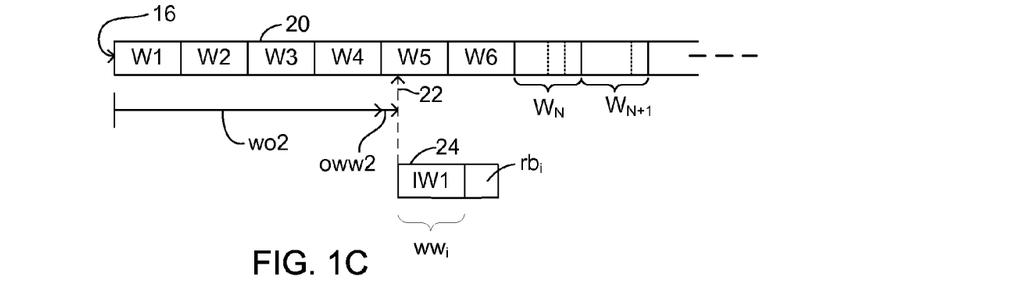
FIG. 1C shows the modified data stream of FIG. 1B with an insertion point and insertee data according to an embodiment.

FIG. 1C shows the modified data stream 20 of FIG. 1B with an insertion point 22 (generally, "modification point") and insertee data according to an embodiment. The insertion point 22 is measured from the beginning 16 of the modified data stream 20 as a number of whole words ww2 (in this case, four whole words) and an offset within a word oww2 (which in this case is an offset within word W5 from the boundary between W4 and W5). Insertee data 24 includes a whole word IW1 and insertion remaining bits $rb_i$. The insertion point 22 is a second modification point upstream from the first modification point 14 in FIG. 1A. Using the beginning 16 of the modified data stream 20 provides a constant reference for I/R points upstream from the first modification point.

Figure 1D:
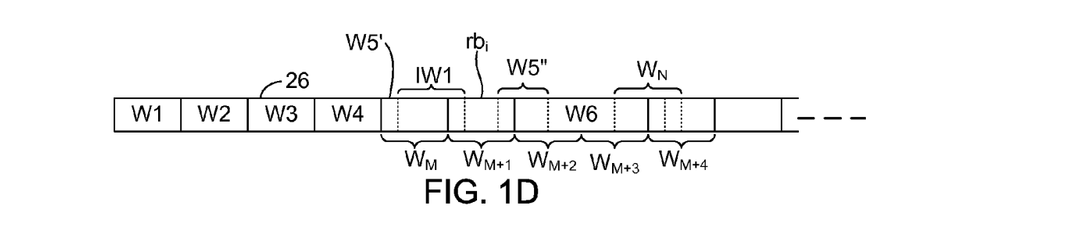
FIG. 1D shows a second modified data stream that includes the inserted data of FIG. 1C.

FIG. 1D shows a second modified data stream 26 that includes the inserted data of FIG. 1C. The inserted data has split the fifth word into two portions of valid bits: a leading word portion W5' (having a number of bits equal to oww2) and a remaining word portion W5"(having a number of bits equal to W-oww2). The next whole word $W_M$ following W4 Is made up of W5' and a leading portion (not separately indicated) of IW1. The next whole word $W_{M+1}$ is made of the remaining portion of IW1 (not separately indicated), rbi, and some of the remaining word portion of W5". The following words $W_{M+2}$, $W_{M+3}$, $W_{M+4}$ are made up of various portions of original words and remainders of original words, and could further include inserted words and inserted remaining bits (e.g., if additional INSERT operations previously occurred). Comparing the orderly nature of the data stream 26 in front of the nearest modification operation to the nature of the downstream data/word structure illuminates the advantage of establishing insertion/removal points from the beginning of the data stream. In alternative embodiments, a partial word is output. For example, an arriving data stream may be in parallel (word) format, while the output data stream may be converted to serial format, such as PCIe.

Additional insertion or removal operations are optionally performed at upstream I/R points. "Upstream" means closer to the beginning 16 of the data stream. The length and nature of the removee and insertee data are arbitrary, and alternatively are whole words without remaining bits, or are only remaining bits (i.e., less than a whole word is removed or inserted). In an alternative embodiment, the second operation is a second REMOVE operation. Similarly, the first operation is alternatively an INSERT operation and the second operation is a REMOVE operation or alternatively another INSERT operation. In an alternative embodiment, the first operation is a REMOVE operation at a REMOVE point in the data stream, and the second operation is an INSERT operation at the same point in the data stream. Other embodiments use only a single INSERT or REMOVE operation. INSERT and REMOVE operations are generally referred to as "modification" operations, the I/R points as modification points, and the insertee or removee data as "modification data".

Figure 2A:
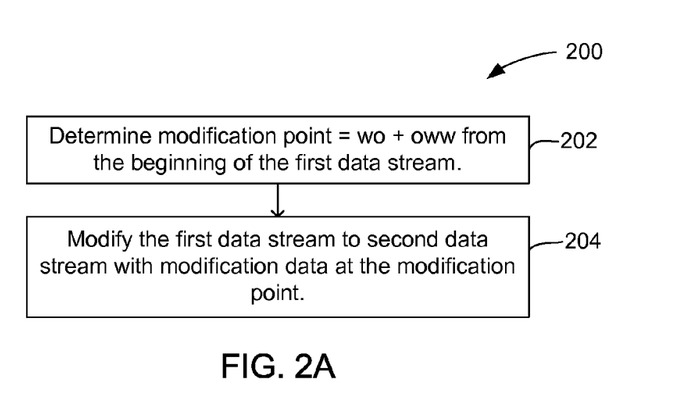
FIG. 2A is a flow chart of a method of converting a first data stream to a second data stream according to an embodiment.

FIG. 2A is a flow chart of a method 200 of converting a first data stream to a second data stream according to an embodiment. A modification point in the first data stream is determined according to a whole word offset, which is an integer number of words and an offset within a word (step 202). The first data stream is modified to the second data stream (step 204) by inserting or removing data at the modification point. In a particular embodiment, the modification data includes one or more whole words ("whole word portion") and remaining bits ("remaining bits portion"). In a further embodiment, the whole word portion is a null portion (i.e., the whole word portion is zero), and the modification data are only remaining bits (i.e., less than a word). In a particular embodiment, the first data stream is a packet or frame. In a particular embodiment, conversion of the first data steam to the second data stream occurs in a synchronous pipeline circuit.

Figure 2B:
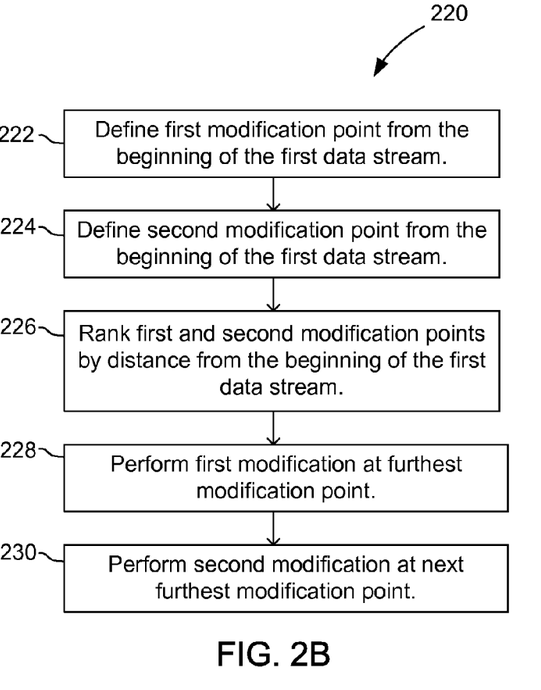
FIG. 2B is a flow chart of a method 220 of converting a first data stream to a third data stream according to another embodiment.

FIG. 2B is a flow chart of a method 220 of converting a first data stream to a third data stream according to another embodiment. The method uses a first machine performing a first modification operation at a first modification point operating in a synchronous fashion with a second machine performing a second modification operation at a second modification point. The first modification point is defined from the beginning of the first data stream as a first word offset and a first offset within a word (step 222). The second modification point is defined from the beginning of the first data stream as a second word offset and a second offset within a word (step 224). In a further embodiment, additional machines performing additional modification operations at additional modification points are included. In alternative embodiments, the first and second modification points are only word offsets or only offsets within a word.

The first modification point and the second modification point are ranked (step 226) according to their distance from the beginning of the first data stream, and the furthest (i.e., most downstream) modification point is selected. For purposes of convenient discussion, in this example, the first modification point is the most downstream modification point. The first machine performs the first modification operation at the first modification point (step 228) to convert the first data stream to a second data stream, and then the second machine performs the second modification operation at the second modification point (step 230) to convert the second data stream to a third data stream. The first modification operation is an INSERT or REMOVE operation of insertee or removee data that in some embodiments includes whole words and remaining bits, and alternatively includes only whole words or only remaining bits.

In a further embodiment, if the first and second modification points are the same point in the first data stream, and the step of ranking includes evaluating the first and second modification operations, and selecting to perform a REMOVE operation before performing an INSERT operation (not separately shown).

Figure 3:
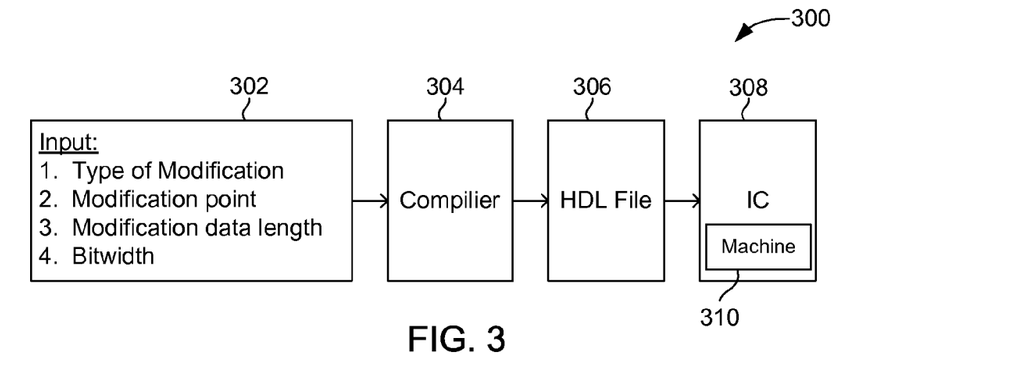
FIG. 3 is a diagram of a system for generating a data stream modification machine(s) according to one or more embodiments of the invention.

FIG. 3 is a diagram of a system 300 for generating a data stream modification machine(s) according to one or more embodiments of the invention. A complier 302 receives input from a textual language specification of a network packet processor 304 including a type of modification (i.e., REMOVE or INSERT), a modification point defined by a word offset and offset within a word from the beginning of the data stream, a modification data length (i.e., the length of data to be removed or inserted), and a bitwidth of the data stream. In an exemplary embodiment, the first three inputs are defined by a user and specified in the textual language specification of the network packet processor and the bitwidth is a function of the IC 308 that will be configured to include the machine(s).

The complier 302 is embodied in a computer-readable medium, such as a file stored on a local magnetic disk or server, a ROM, or an optical disk. The complier 304 produces a circuit description 306 (e.g., a VHDL file) that configures the IC 308 to include the machine 310. In a particular embodiment, the IC is an FPGA and the complier is a complier system for packet processing. In a particular embodiment, the data stream modification machine is a synchronous pipeline circuit configured in the fabric of an FPGA. The IC is alternatively an ASIC.

Figure 4:
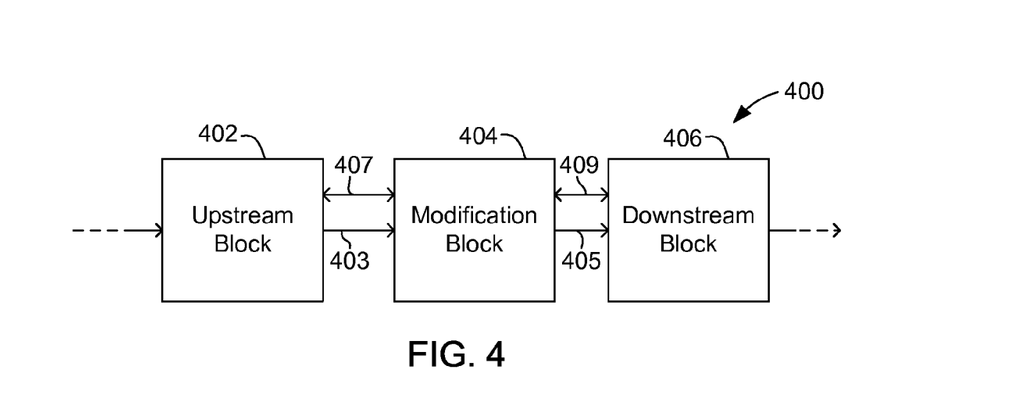
FIG. 4 is a diagram of a data stream modification system with insert or remove blocks according to an embodiment.

FIG. 4 is a diagram of a data stream modification system 400 with insert or remove blocks according to an embodiment. The blocks are portions (sub-circuits) of a data stream modification machine. Data 403, 405 flows from left to right (i.e., from block 402 to block 404, to block 406), but control signals 407, 409 flow in both directions. Block 402 is an interface block, an insert block (either according to an embodiment or an alternative insert block), a remove block (either according to an embodiment or an alternative remove block), a receive block, or other processing block. Block 404 is an insert block or a remove block according to an embodiment, and block 406 is an interface block, another insert block (either according to an embodiment or an alternative insert block), another remove block (either according to an embodiment or an alternative remove block), or another processing block. Additional blocks can precede block 402 or follow block 406, as indicated by dashed lines. Alternatively block 402 can be the first block in a chain of blocks or block 406 can be the last block in a chain of blocks. Some embodiments have over 10 insert or remove blocks chained together, and some have as many as 30 blocks chained together; however, these numbers are merely exemplary and not limiting.

In a particular example, when block 404 is a remove block according to an embodiment, block 404 skips wo valid input words from block 402 and then reads the next valid input word from block 402 and, in the case where rb<=w-oww, block 404 has a register size of w-rb. If oww is greater than zero, the first oww bits of the last read word from block 402 are stored in the top part of the register, and block 404 output one invalid word to block 406. If ww>0, block 404 inputs ww valid words from block 402 and outputs invalid words to block 406. If w-oww-rb>0, block 404 stores the last w-oww-rb bits of the last-read valid word from block 402 in the bottom part of the register. Block 404 then inputs valid words from block 402. The register contents of block 404 and the first rb bits of the input from block 402 are output to block 406, and the last w–rb bits of the input are stored in the register in block 404. At the end, block 404 outputs the register contents and rb zeros as an extra valid word to block 406. Valid words from block 402 are words that have the validInput flag set. To send invalid words to block 406, block 404 de-asserts the validOutput flag. The blocks act in a synchronous pipeline, so there are data and flags coming every cycle. The valid/invalid flags are used to keep pumping data through the pipeline, as one cannot suspend pipeline operation until valid data is received or ready to be sent.

Table 2 summarizes the operation of FIG. 4:

TABLE 2

Block Interface for FIG. 4

| Name | Source/Destination | Purpose |
| --- | --- | --- |
| readyOutput | From 404 to 402 | Indicated insertion is occurring |
| din | From 4102 to 404 | Current data stream |
| validInput | From 402 to 404 | Valid flag for din |
| readyInput | From 402 to 404 | Downstream is ready to send |
| dout | From 404 to 406 | New data stream |
| validOutput | From 404 to 406 | Valid flag for dout |
| numDataInValid | From 402 to 404 | Number of valid bits in the current input word (din) |
| numDataOutValid | From 404 to 406 | Number of valid bits in the current output word (dout) |
| eofIN | From 402 to 404 | End of frame indication for current input packet on din |
| oefOut | From 404 to 406 | End of frame indication for curreing output packet on dout |

Figure 5:
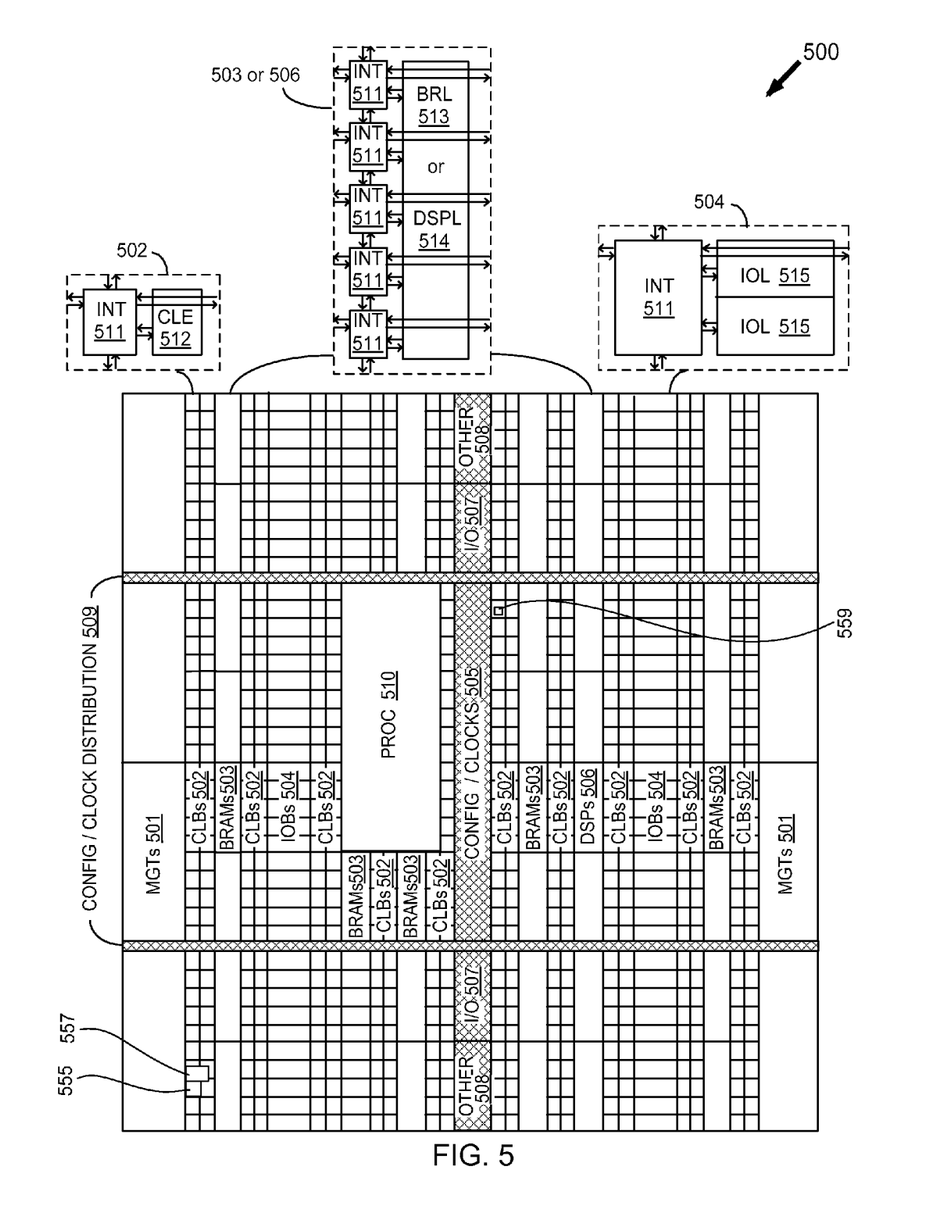
FIG. 5 is a floor plan of an FPGA with a data stream modification machine according to an embodiment of the invention.

FIG. 5 is a floor plan of an FPGA 500 with a data stream modification machine 555 according to an embodiment of the invention. The FPGA 500 includes CMOS portions in several of the functional blocks, such as in RAM and logic, and is fabricated using a CMOS fabrication process. FPGAs are configured to perform the desired function(s) in a variety of ways, such as using an HDL file to configure the hardware (logic and switches) of the FPGA. In a particular embodiment, a complier automatically generates the HDL or other hardware definition to configure the hardware of the FPGA to the desired data stream modification machine (circuit).

One or more data stream modification machines 555, 557, 559 according to one or more embodiments of the invention are incorporated in any of several functional blocks of the FPGA, such as a configurable logic block ("CLB") 502 or other functional block; within many functional blocks; or within a physical section or segment of the FPGA 500. Data stream modification machines 555, 557, 559 are particularly desirable in applications where packets of data are modified by removing or inserting data in a packet processing system. Additional data might include additional header, status, or payload information, for example, or removed data might be header or payload data that is no longer needed. The data streams arriving at or output from the data stream modification machine(s) can be in parallel form (e.g., parallel bus) or in serial form, such as PCIe.

The FPGA architecture includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), specialized input/output blocks (I/O 507) (e.g., configuration ports and clock ports), and other programmable logic 508 such as digital clock managers, analog-to-digital converters, system monitoring logic, and so forth. Some FPGAs also include dedicated processor blocks (PROC 510).

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element (INT 511) also includes the connections to and from the programmable logic element within the same tile, as shown by the examples included at the top of FIG. 5.

For example, a CLB 502 can include a configurable logic element (CLE 512) that can be programmed to implement user logic plus a single programmable interconnect element (INT 511). A BRAM 503 can include a BRAM logic element (BRL 513) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 506 can include a DSP logic element (DSPL 514) in addition to an appropriate number of programmable interconnect elements. An IOB 504 can include, for example, two instances of an input/output logic element (IOL 515) in addition to one instance of the programmable interconnect element (INT 511). As will be clear to those of skill in the art, the actual I/O pads connected, for example, to the I/O logic element 515 are manufactured using metal layered above the various illustrated logic blocks, and typically are not confined to the area of the input/output logic element 515. In the pictured embodiment, a columnar area near the center of the die (shown shaded in FIG. 5) is used for configuration, clock, and other control logic.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, to facilitate the efficient implementation of user logic.

The following is a VHSIC hardware design language ("VHDL") description of a state machine for performing an optional insertion in the first word of a data stream, such as a packet or other data stream, according to an embodiment. Those of skill in the art of VHDL will note the effects of the design technique, which is seen in terms of the storage register used, the interleaving of the storage register with the input data, and the four regions described above in reference to FIG. 4. Additional machines for removing or inserting bits from a data stream are similarly built, and may be chained to perform several remove or insertion operations on a data stream. In a particular embodiment, an interface between machines is in accordance with Table 1; however, other interfaces are alternatively used. Interface values are directly read from or written to the upstream or downstream machines, or are read from or written to an interface block. The VHDL description given above configures a state machine according to an embodiment in an FPGA, CPLD, or ASIC, for example.

In some embodiments, support structures for the machines are also automatically built. For example, the values representing the guards (guard expression) are calculated early in the pipeline for both insert and remove blocks. The guards are Boolean expression that determine whether the insert or remove should take place or not, allowing optional (conditional) insertion or removal operations. If the guard expression is valid, the modification operation is executed, if not, the modification operation is not executed. Then, the single value to be inserted must also be calculated. An example would be to produce SET statements for each of the required values, and to schedule these in a manner as described in co-owned U.S. patent application Ser. No. 11/799,860, entitled PIPELINE FOR PROCESSING NETWORK PACKETS, filed May 3, 2007, by Keller et al., the disclosure of which is hereby incorporated by reference in its entirety for all purposes. These calculated values would then be made available to the insert and remove machines. In the VHDL listing below, the testing of the Boolean guard bit ("guard") and the slicing of the data to be inserted ("insertData") is shown:

```
runsm : process(state, validInput, numDataInValid, readyInput,
eofSeen, eofIn, guard, scratch, din, insertData)
   begin
      case state is
         when beforeInsert0 =>
            eofSeen_i <= '0';
            readyOutput <= readyInput;
            dout <= din;
            validOutput <= validInput;
            numDataOutValid <= numDataInValid;
            scratch_i <= scratch;
            if (readyInput '1' and validInput = '1') then
               if (guard = '1') then
                  dout <= din(31 downto 23) & insertData(31 downto 9);
                  readyOutput <= '0';
                  scratch_i <= din(22 downto 0);
               else
                  readyOutput <= readyInput;
                  dout <= din;
               end if;
               numDataOutValid <= numDataInValid;
               validOutput <= '1';
               if (eofIn <= '1') then
                  eofOut_i <= '1';
                  nextState <= beforeInsert0;
               else
                  eofOut_i <= '0';
                  nextState <= duringInsert1;
               end if;
            else
               eofOut_i <= '0';
               nextState <= beforeInsert0;
            end if;
         when duringInsert0 =>
            lastNumDataInValid_i <= numDataInValid;
            eofSeen_i <= eofSeen or eofIn;
            if (readyInput = '1' and validInput = '1') then
               if (guard = '1') then
                  dout <= din(31 downto 23) & insertData(31 downto 9);
                  readyOutput <= '0';
                  scratch_i <= din(22 downto 0);
               else
                  readyOutput <= readyInput;
                  dout <= din;
                  scratch_i <= scratch;
               end if;
               validOutput <= validInput;
               if (eofIn = '1') then
                  if (guard = '0') then
                     numDataOutValid <= numDataInValid;
                     eofOut_i <= '1';
                     nextState <= beforeInsert0;
                  else
                     numDataOutValid <= (others => '1');
                     eofOut_i <= '0';
                     nextState <= duringInsert1;
                  end if;
               else
                  numDataOutValid <= numDataInValid;
                  eofOut_i <= '0';
                  nextState <= duringInsert1;
               end if;
            else
               eofOut_i <= '0';
               dout <= din;
               scratch_i <= scratch;
               numDataOutValid <= numDataInValid;
               nextState <= duringInsert0;
               validOutput <= validInput;
               readyOutput <= readyInput;
            end if;
         when duringInsert1 =>
            lastNumDataInValid_i <= numDataInValid;
            eofSeen_i <= eofSeen or eofIn;
            if (readyInput = '1' and validInput = '1') then
               if (guard = '1') then
                  readyOutput <= readyInput;
                  scratch_i <= scratch;
                  dout <= insertData(8 downto 0) & scratch(22 downto 0);
                  scratch_i(22 downto 0) <= din(22 downto 0);
                  numDataOutValid <= (others => '1');
                  validOutput <= '1';
               else
                  dout <= din;
                  readyOutput <= readyInput;
                  validOutput <= validInput;
                  scratch_i <= scratch;
               end if;
               if (eofIn = '1') then
                  if (guard = '0') then
                     numDataOutValid <= numDataInValid;
                     eofOut_i <= '1';
                     nextState <= beforeInsert0;
                  else
                     if (eofSeen = '1') then
                        if ((guard = '1') and (0 > (31-numDataInValid)))
                           then
                           eofOut_i <= '0';
                           numDataOutValid <= (others => '1');
                           nextState <= drainRegister;
                        else
                           numDataOutValid <= numDataInValid+0;
                           eofOut_i <= '1';
                           nextState <= beforeInsert0;
                        end if;
                     else
                        numDataOutValid <= numDataInValid;
                        eofOut_i <= '0';
                        nextState <= waitForEOF;
                     end if;
                  end if;
               else
                  if (eofSeen = '1') then
                     if ((guard = '1') and (0 > (31-numDataInValid))) then
                        eofOut_i <= '0';
                        numDataOutValid <= (others => '1');
                        nextState <= drainRegister;
                     else
                        numDataOutValid <= numDataInValid+0;
                        eofOut_i <= '1';
                        nextState <= beforeInsert0;
                     end if;
                  else
                     numDataOutValid <= numDataInValid;
                     eofOut_i <= '0';
                     nextState <= waitForEOF;
                  end if;
               end if;
            else
               dout <= din;
               nextState <= duringInsert1;
```

```
            validOutput <= validInput;
            readyOutput <= readyInput;
            eofOut_i <= '0';
            scratch_i <= scratch;
            numDataOutValid <= numDataInValid;
          end if;
        when waitForEOF =>
          eofSeen_i <= eofSeen or eofIn;
          readyOutput <= readyInput;
          if (guard = '1') then
            dout <= din;
            scratch_i <= scratch;
          else
            scratch_i <= scratch;
            dout <= din;
          end if;
          validOutput <= validInput;
          if (readyInput = '1' and validInput = '1' and eofIn = '1') then
            if ((guard = '1') and (0 > (31-numDataInValid))) then
              eofOut_i <= '0';
              numDataOutValid <= (others => '1');
              nextState <= drainRegister;
            else
              eofOut_i <= '1';
              if (guard = '1') then
                numDataOutValid <= numDataInValid + 0;
              else
                numDataOutValid <= numDataInValid;
              end if;
              nextState <= beforeInsert0;
            end if;
          else
            numDataOutValid <= numDataInValid;
            eofOut_i <= '0';
            nextState <= waitForEOF;
          end if;
        when drainRegister =>
          eofSeen_i <= eofSeen or eofIn;
          readyOutput <= '0';
          dout <= din;
          scratch_i <= scratch;
          numDataOutValid <= lastNumDataInValid + 0;
          validOutput <= '1';
          if (readyInput = '1') then
            eofOut_i <= '1';
            nextState <= beforeInsert0;
          else
            eofOut_i <= '0';
            nextState <= drainRegister;
          end if;
      end case;
    end process;
end synth;
```

What is claimed is:

1. A method of modifying a data stream in an integrated circuit ("IC"), comprising:
compiling a hardware definition of a data stream modification circuit in the IC from a textual packet processing language specification of the data stream modification circuit, the textual packet processing language specification including a modification type, a modification point including a word offset portion and an offset within a word portion, a modification data length, and a bitwidth of the data stream;
wherein the compiling includes determining a modification point in the data stream from a beginning of the data stream, the modification point having an offset within a word of the data stream;
configuring the integrated circuit with a machine that implements the data stream modification circuit in the IC; and
modifying the data stream with modification data by the machine that implements the data stream modification circuit at the modification point to produce a second data stream in the IC.

2. The method of claim 1 wherein the step of modifying the data stream comprises removing the modification data from the data stream, the modification data including removal remaining bits less than a word.

3. The method of claim 2 wherein the modification data further includes at least one removal word.

4. The method of claim 2 further comprising, before modifying the data stream, evaluating a guard expression, and if the guard expression is valid, modifying the data stream.

5. The method of claim 1 wherein the step of modifying the data stream comprises inserting the modification data into the data stream, the modification data including insertion remaining bits less than a word.

6. The method of claim 5 wherein the modification data further includes at least one insertion word.

7. The method of claim 5 further comprising, before modifying the data stream, evaluating a guard expression, and if the guard expression is valid, modifying the data stream.

8. The method of claim 1 wherein the modification point further includes a word offset added to the offset within a word.

9. The method of claim 1 further comprising:
determining a second modification point in the data stream upstream from the modification point; and
after the step of modifying the data stream, modifying the second data stream with second modification data at the second modification point.

10. The method of claim 1 further comprising, before modifying the data stream:
determining a second modification point in the data stream; and
ranking the modification point and the second modification according to distance from the beginning of the data stream; and,
if the modification point is further from the beginning of the data stream, performing the step of modifying the data stream with modification data at the modification point to produce a second data stream; and then
modifying the second data stream with second modification data at the second modification point to produce a third data stream.

11. A computer-readable medium for generating a data stream modification circuit in an integrated circuit ("IC") comprising:
computer readable instructions stored in the computer-readable medium for compiling a hardware definition of the data stream modification circuit in the IC from a textual packet processing language specification of the data stream modification circuit, the textual packet processing language specification providing input to the instructions for compiling including a modification type, a modification point including a word offset portion and an offset within a word portion, a modification data length; and a bitwidth of a data stream in the IC being provided to the instructions for compiling.

12. An integrated circuit comprising:
a machine configured in the integrated circuit to convert a first data stream in the integrated circuit to a second data stream in the integrated circuit, the machine having a first modification block modifying the first data stream at a first modification point defined by a first word offset from a beginning of the first data stream and a first offset within a word to produce the second data stream.

13. The integrated circuit of claim 12 wherein the first modification block is a first data insertion block inserting data having insertion remainder bits less than a word of the first data stream.

14. The integrated circuit of claim 12 wherein the first modification block is a first data removal block removing data having removal remainder bits less than a word of the first data stream.

15. The integrated circuit of claim 12 further comprising a second modification block of the machine modifying the second data stream to a third data stream, the second modification point defined by a second word offset from the beginning of the first data stream and a second offset with a word, the second modification point being closer to the beginning of the first data stream than the first modification point.

16. The integrated circuit of claim 15 wherein the first modification block and the second modification block comprise a synchronous pipeline.

17. The integrated circuit of claim 16 wherein the first modification block is a first data removal block removing removal data having removal words and removal remainder bits, the first removal block outputting at least one invalid word to the second modification block.

18. The integrated circuit of claim 12 wherein the machine further includes a register storing first offset within a word bits of the first data stream.

* * * * *